April 9, 1946.  S. A. STONE  2,398,261

FLEXIBLE COUPLING

Filed Nov. 24, 1941  2 Sheets-Sheet 1

INVENTOR.
SPENCER A. STONE,
BY
ATTORNEYS.

April 9, 1946.  S. A. STONE  2,398,261
FLEXIBLE COUPLING
Filed Nov. 24, 1941  2 Sheets-Sheet 2

INVENTOR.
SPENCER A. STONE,
BY
ATTORNEYS

Patented Apr. 9, 1946

2,398,261

UNITED STATES PATENT OFFICE 2,398,261

FLEXIBLE COUPLING

Spencer A. Stone, Fort Wayne, Ind., assignor to The Deister Concentrator Company, Fort Wayne, Ind., a corporation of Indiana Application November 24, 1941, Serial No. 420,225

6 Claims. (Cl. 192—45)

My invention relates to flexible couplings for drivingly interconnecting two approximately coaxial shafts. In its broader aspects, my invention relates to a coupling capable of transmitting rotation in either direction between the two shafts; but in its narrower aspects, my invention is concerned with a unidirectional flexible coupling.

It is the object of my invention to produce a flexible coupling which can be simply and economically manufactured, which will provide for considerable misalinement of the shafts which it interconnects, which will possess shock-absorbing capabilities, and which at the same time will provide a positive driving connection between the shafts in either one or both directions.

In carrying out my invention, I employ two generally concentric coupling members adapted to be rigidly connected respectively to the two shafts between which the coupling is to act. These two coupling members are provided with axial co-extensive portions the opposed faces of which are spaced apart radially, and in the space thus provided there are disposed a circumferential series of interconnecting elements which act between the coupling members to transmit torque from one to the other. Wherever engagement is to occur between an interconnecting element and one of the coupling members, one of the interengaging parts is faced with soft rubber or other material relatively yieldable in character. The yielding character of this material permits misalinement of the two coupling members while still providing for a driving connection between them. In the case of a bidirectional coupling, the interconnecting elements between the two coupling members will be arranged so as to be moved into operative position irrespective of the relative direction of rotation of the two coupling members; but in the case of a unidirectional coupling, the structure is so arranged that the interconnecting elements can become drivingly engaged with both coupling members only when the latter tend to rotate relatively in one direction.

Figure 1:
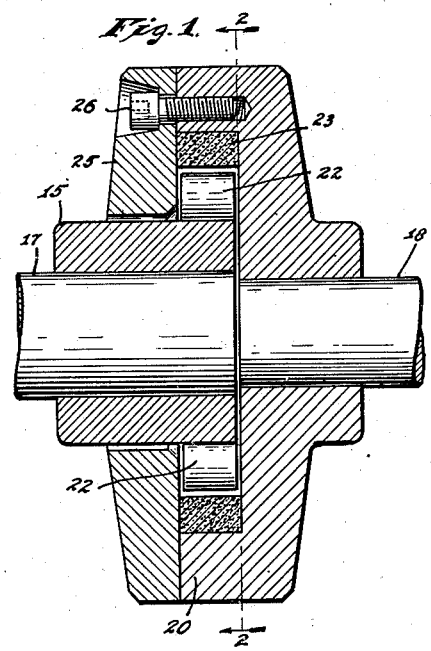
Figure 2:
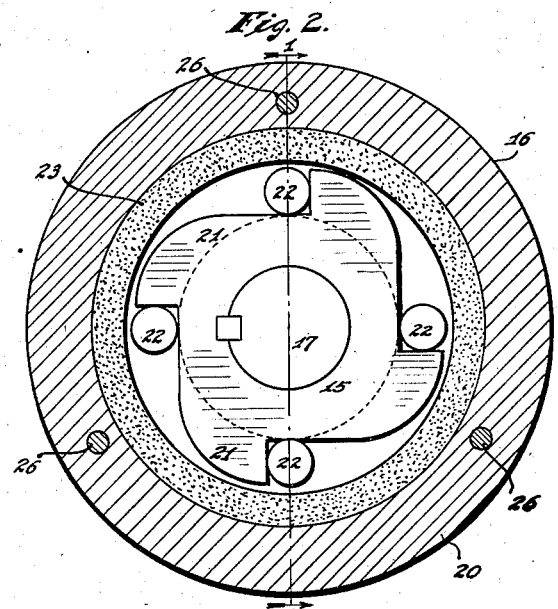
Figure 3:
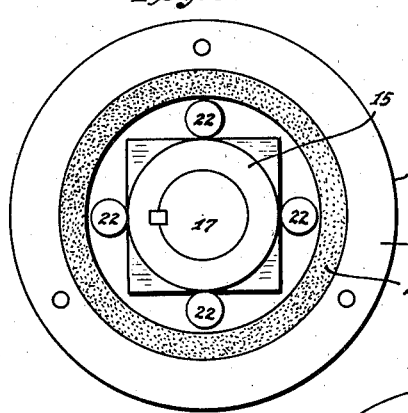
Figure 4:
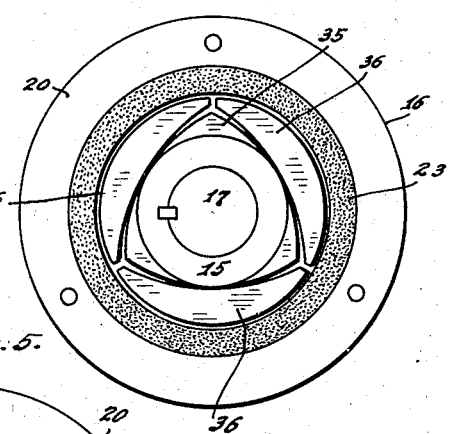
Figure 5:
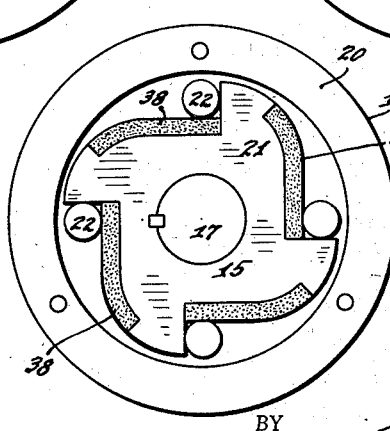
Figure 6:
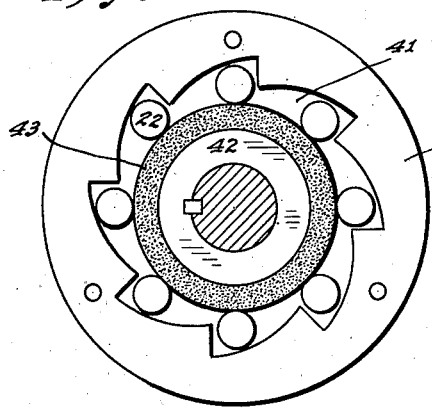
Figure 7:
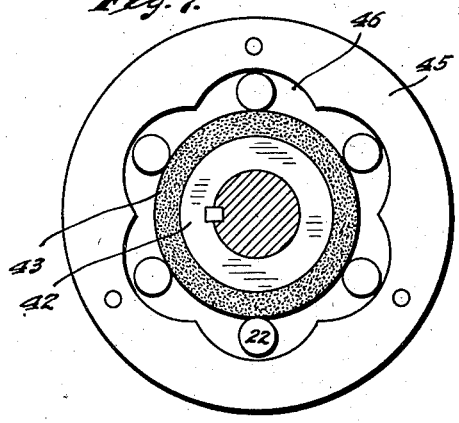
Figure 8:
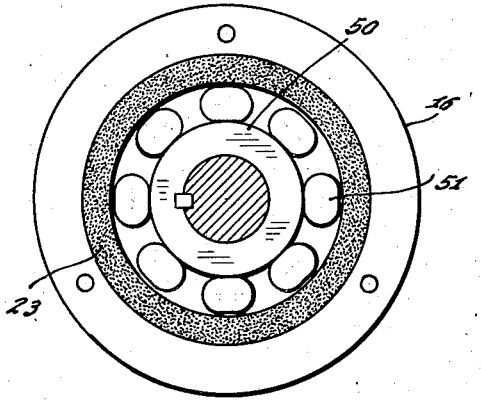
Figure 9:
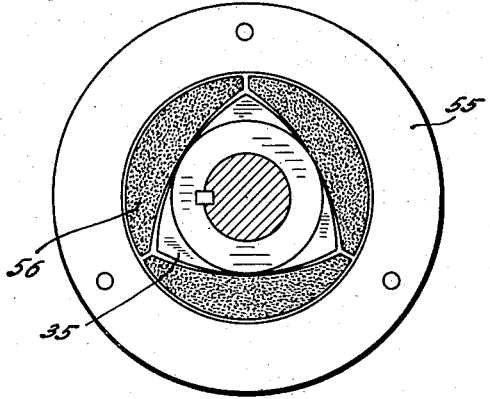
Figure 10:
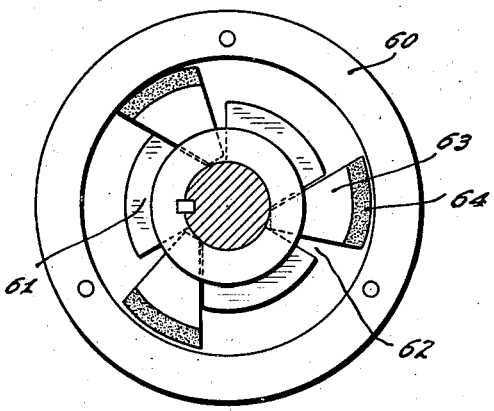
Figure 11:
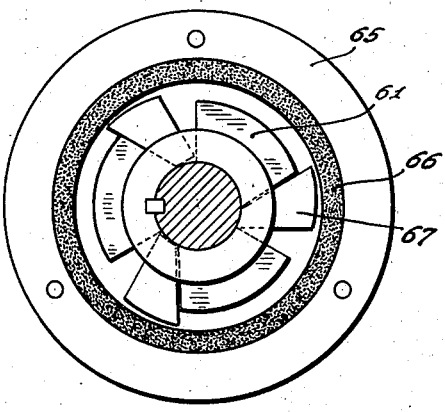

The accompanying drawings illustrate my invention: Fig. 1 is an axial section on the line 1—1 of Fig. 2 through a unidirectional coupling which, aside from the embodiment of my invention therein, is of more or less conventional form; Fig. 2 is a transverse section on the line 2—2 of Fig. 1; Figs. 3 and 4 are views similar to Fig. 2 showing two different forms of bidirectional couplings; Fig. 5 is a view similar to Fig. 2 showing a modification of the device illustrated in Figs. 1 and 2; Fig. 6 is a view similar to Fig. 2 showing a modified form of unidirectional coupling; Figs. 7 and 8 are views similar to Fig. 2 illustrating two different forms of bidirectional coupling; Fig. 9 is a transverse cross-section illustrating a bidirectional coupling constituting a modification of Fig. 4; and Figs. 10 and 11 are transverse sections illustrating two different and further modifications of a unidirectional coupling.

The device illustrated in Figs. 1 and 2 comprises an inner coupling member 15 and an outer coupling member 16 adapted to be connected respectively to two shafts 17 and 18. The outer coupling member 16 is provided with a peripheral flange 20 which overlaps axially the inner coupling member 15. Within the flange 20, the inner coupling member is provided with an annular flange 21 notched at regularly spaced intervals for the reception of interconnecting elements shown in the form of cylindrical rollers 22. Lying against the inner face of the flange 20 is a ring 23 of soft rubber or similar material, such ring being either molded in annular form or formed by a flat strip of rubber curved to fit against the inner face of the flange 20. A ring 25 secured to the end face of the flange 20 as by screws 26 serves to retain the rollers 22 and ring 23 in position.

Each of the roller-receiving notches of the flange 21 has one face which is generally radial and another face which is generally tangential, and the distance between diametrically opposite tangential notch-faces, plus twice the diameter of the rollers 22, is somewhat less than the interior diameter of the ring 23. As a result, when the rollers lie against the generally radial notched faces, as indicated in Fig. 2, they are out of contact with the ring 23. When the two coupling members 15 and 16 rotate in a direction tending to move the rollers 22 toward the position illustrated in Fig. 2, the radial notch-faces will limit movement of the rollers to the position illustrated, in which they will be out of engagement with the ring 23, and free relative rotation of the two coupling members will be permitted. When, however, the two coupling members tend to rotate in the opposite direction, the rollers will move outwardly along the tangential notch-faces and become wedged against the inner face of the ring 23. Because of the yielding character of the ring 23, all the rollers 22 may become wedged against its inner face even though there is some misalignment of the two shafts 17 and 18.

The opening in the ring 25, through which the coupling member 15 extends, is sufficiently larger than the outer diameter of such coupling member to permit some misalinement of the shafts 17 and 18. In addition, the length of the rollers 22 is somewhat less than the axial extent of the flange 20 in order to permit some cocking of the rollers should the axes of the shafts 17 and 18 be at an angle to each other.

The coupling of Fig. 3 is similar to that of Fig. 1 except that the flange 30 on the inner member 15 is square instead of being notched. In this construction, irrespective of the direction in which the two coupling members tend to rotate relative to each other, the rollers 22 will be forced in one direction or the other from the positions illustrated in Fig. 3 into wedged engagement between the faces of the flange 30 and the inner face of the resilient ring 23. Thus, the coupling shown in Fig. 3, while possessing the same possibilities of flexibility as that illustrated in Figs. 1 and 2, will transmit rotation in both directions between the two shafts which it interconnects.

The construction illustrated in Fig. 4 is, like that of Fig. 3, a bidirectional coupling. It includes the outer coupling member 16 and ring 23 of yielding material; but the inner coupling member 35 is in the form of an equilateral curvilinear triangle and the wedging elements 36 are crescent-shaped. Irrespective of the direction in which the inner and outer coupling members tend to rotate, the crescent-shaped wedging elements 36 will be wedged between the curvilinear sides of the inner coupling member 35 and the inner surface of the compressible ring 23 to establish a driving connection.

The coupling shown in Fig. 5 is unidirectional in character and is identical with that shown in Figs. 1 and 2 except that the compressible ring 23 is eliminated and the tangential faces of the notches in the inner coupling member 21 are faced with strips 38 of compressible material. This coupling operates exactly as does that shown in Fig. 1. When the inner coupling member 21 tends to rotate in a clockwise direction relative to the outer coupling member 16, each of the rolls 22 will become wedged between the inner face of the coupling member 16 and the associated strip 38 of compressible material to establish a driving connection between the two coupling members. If the inner member 21 tends to rotate in a counterclockwise direction relative to the outer member, the rollers 22 will assume the positions illustrated in Fig. 5, where they lie against the radial faces of the notches out of contact with the outer coupling member, thus permitting free relative rotation of the two members.

The coupling of Fig. 6 is also unidirectional in character, but in this instance the roller-receiving notches are provided in the outer coupling member and engage a compressible facing on the inner member. Specifically, the outer coupling member 40 is provided in its inner face with an annular series of roller-receiving notches 41 each having a radial face and a spirally inclined face. The inner coupling member 42 is faced with a ring 43 of compressible material, and rollers 22 are located in the respective notches 41. In this coupling, if the inner member tends to rotate in a clockwise direction relative to the outer member, the rollers 22 will move to positions adjacent the radial faces of the respective notches and will provide no connection between the two coupling members. However, should the inner member tend to rotate in the counterclockwise direction relative to the outer member, the rollers would be forced into contact with the spirally inclined faces of the notches 41 and would become wedged against the compressible face 43 to provide a driving connection.

The coupling of Fig. 7 is similar to that of Fig. 6 except that it is bidirectional in character. It embodies the same inner member 42 with its compressible facing 43, but the outer coupling member 45 is provided on its inner surface with an annular series of notches 46 which are of arcuate form and concave inwardly. In this construction, irrespective of the direction in which the inner and outer coupling members tend to rotate, the rollers 22 will be wedged between the walls of the notches 46 and the compressible facing 43 of the inner coupling member to provide a driving connection.

The coupling illustrated in Fig. 8 embodies the same outer member 16 with its associated ring 23 of compressible material as is employed in the construction of Figs. 1 and 2. The inner member 40, however, is circular in form while the clutching elements 51 are non-circular. Preferably, each of the clutching elements 51 is ovoid in shape with its major axis disposed circumferentially and its minor axis radially of the coupling. Any tendency of the two coupling members 16 and 50 to rotate in either direction relative to each other will cause the clutching elements 51 to assume a canted position in which they will be wedged between the periphery of the inner coupling member 50 and the compressible facing 23 on the outer member 16. This coupling is bidirectional in character.

The coupling of Fig. 9 is a modification of that illustrated in Fig. 4, and is also bidirectional in character. Here, the outer coupling member 55 is not provided with a compressible inner facing. Instead, the crescent-shaped clutching elements 56 are made of compressible material. Relative rotation of the inner coupling member 35 and the outer member 55 in either direction will cause the crescent-shaped elements 56 to become wedged between the inner and outer coupling members to provide a driving connection from one to the other.

The coupling shown in Fig. 10 is unidirectional in character. It comprises an outer member 60 and an inner member 61, the latter being provided with a circumferential series of V-shaped notches 62. Each of the notches 62 receives the apex of a generally triangular clutching element 63. The outer face of each of the clutching elements 63 is covered with a layer of compressible material 64, and the outer surface of this compressible material is arcuate in form and eccentric to the inner end or apex of the associated triangular clutching element 63. The distance along one face (shown as the counterclockwise face) of each of the clutching elements 63, from the inner apex of such clutching element to the outer surface of the facing 64, is greater than the distance between the base of the associated notch 62 and the inner face of the outer clutching element 60; while, because of the eccentricity of the outer face of the compressible facing 64, the corresponding distance along the opposite (clockwise) face of the clutching element 63 is less than the distance between the base of the notch 62 and the inner face of the outer clutching element 60. The side walls of the notches 62 diverge to a greater extent than do the side faces of the clutching elements 63, so that each clutching element may rock in its associated notch. If the inner coupling member 61 tends to rotate in a clockwise direction relative to the outer member 60, the clutching elements 63 will occupy the respective positions illustrated in Fig. 10 in which they do not provide a driving connection between the two clutch members. Should the inner coupling member 61, however, tend to rotate in a counterclockwise direction relative to the outer member, the clutching elements 63 would swing rearwardly in their respective notches and become wedged against the inner face of the outer coupling member 60 to provide a driving connection.

The coupling of Fig. 11 is like that of Fig. 10 except for the disposition of the compressible material. Here, the outer coupling member 65 is provided on its inner face with a ring 66 of compressible material, while the clutching elements 67 are formed entirely of rigid material. This coupling operates in a manner identical with that of Fig. 10 to provide a unidirectional driving connection between the two coupling members.

Various substances may be used as the compressible material employed at the different positions above set forth. I prefer to employ rubber of a character such as is used to form the tread portions of pneumatic tire casings. If the compressible material is too soft and yielding it might, in some constructions, permit the wedging elements to pass their points of greatest wedging action thus releasing the driving connection between the two coupling members. For example, in the construction of Figs. 1 and 2, if the ring 23 was excessively soft and yielding each of the rolls 22 might be forced into it far enough to permit the high points of the flange 21 to pass it, thus enabling the two coupling members to rotate relatively to each other. On the other hand, if the compressible material is too hard and unyielding, the amount of shaft-misalinement which the coupling permits will be restricted and, in addition, the possibility of slippage between frictionally engaged surfaces will be increased.

All modifications of my invention described herein not only provide for misalinement between the two shafts which the coupling connects, and provide for such misalinement irrespective of whether or not the connection effected is unidirectional or bidirectional, but they also possess capabilities of absorbing shocks between the driving and driven shafts. These shock absorbing capabilities arise from the presence of the compressible material, which transmits a gradually increasing torque from the driving shaft to the driven shaft as it yields, thus providing a cushioning action which greatly reduces stresses arising from the imposition of shock loads.

I claim as my invention:

1. A flexible shaft coupling, comprising an outer member and an inner member adapted to be secured respectively to two approximately alined shafts and capable of radial movement relative to each other, one of said members having a cylindrical surface, an annular series of rollers disposed at angularly spaced intervals around said cylindrical surface, the other of said members having associated with each of said rollers a surface gradually converging in one circumferential direction with the cylindrical surface on said first named member whereby each roller will be gripped between the converging surfaces on opposite sides of it when said members tend to rotate relatively in one direction, the roller-engaging surface or surfaces on one of said members being faced with resilient material capable of yielding radially to permit misalinement of said members.

2. A flexible shaft coupling, comprising an outer member and an inner member adapted to be secured respectively to two approximately alined shafts and capable of radial movement relative to each other, one of said members having a cylindrical surface, an annular series of rollers disposed at angularly spaced intervals around said cylindrical surface, the other of said members having associated with each of said rollers a surface gradually converging with the cylindrical surface on said first named member whereby each roller will be gripped between the converging surfaces on opposite sides of it when said members tend to rotate relatively, the roller-engaging surface or surfaces on one of said members being faced with resilient material capable of yielding radially to permit misalinement of said members.

3. A flexible shaft coupling, comprising an outer member and an inner member adapted to be secured respectively to two approximately alined shafts and capable of radial movement relative to each other, said outer member having an inner cylindrical surface, an annular series of rollers disposed at angularly spaced intervals within and adjacent said cylindrical surface, said inner member having associated with each of said rollers a surface gradually converging in one circumferential direction with said cylindrical surface whereby each roller will be gripped between the converging surfaces on opposite sides of it when said two members tend to rotate relatively in one direction, said cylindrical surface on said outer member being faced with resilient material capable of yielding radially to permit misalinement of said members.

4. A flexible shaft coupling, comprising an outer member and an inner member adapted to be secured respectively to two approximately alined shafts and capable of radial movement relative to each other, one of said members having a radially presented, concentric, circumferentially continuous face, and an annular series of connecting elements located between such face and the other member, and adapted to be angularly displaced in one direction and wedged thereagainst by relative rotation of said two members in one direction to effect a driving connection from one member to the other and to be angularly displaced in the opposite direction to permit relative rotation of said two members in the other direction, one of said members having element-engaging surface portions of resilient material capable of yielding radially to permit misalinement of said two members.

5. A flexible shaft coupling, comprising an outer member and an inner member adapted to be secured respectively to two approximately alined shafts and capable of radial movement relative to each other, one of said members having a radially presented, concentric, circumferentially continuous face, and an annular series of connecting elements located between such face and the other member, and adapted to be independently angularly displaced in one direction and wedged thereagainst by relative rotation of said two members in one direction to effect a driving connection from one member to the other and to be angularly displaced in the opposite direction to permit relative rotation of said two members in the other direction, each of said connecting elements engaging one of said members through a surface portion of resilient material capable of yielding radially to permit the said wedging of all the connecting elements in spite of misalinement of said two members.

6. A flexible shaft coupling, comprising an outer member and an inner member adapted to be secured respectively to two approximately alined shafts and capable of radial movement relative to each other, and an annular series of connecting elements located between said two members and adapted to be independently angularly displaced in one direction and wedged into torque-transmitting relationship with both said members when the latter tend to rotate relatively in one direction and to be angularly displaced in the opposite direction out of torque-transmitting relationship with at least one of said members when the latter tend to rotate relatively in the other direction, each of said connecting elements engaging one of said members through a surface portion of resilient material capable of yielding radially to permit the said wedging of all the connecting elements in spite of misalinement of said two members.

SPENCER A. STONE.